United States Patent
Anicic et al.

(10) Patent No.: US 12,443,660 B2
(45) Date of Patent: Oct. 14, 2025

(54) GATEWAY AND METHOD FOR TRANSFORMING A DESCRIPTION OF AN INDUSTRIAL PROCESS EQUIPMENT INTO A DATA INFORMATION MODEL

(71) Applicant: Siemens Aktiengesellschaft, Munich (DE)

(72) Inventors: Darko Anicic, Munich (DE); Alexander Hoffman, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 849 days.

(21) Appl. No.: 17/418,767

(22) PCT Filed: Nov. 28, 2019

(86) PCT No.: PCT/EP2019/082917
§ 371 (c)(1),
(2) Date: Jun. 25, 2021

(87) PCT Pub. No.: WO2020/135968
PCT Pub. Date: Jul. 2, 2020

(65) Prior Publication Data
US 2022/0058502 A1 Feb. 24, 2022

Related U.S. Application Data

(63) Continuation of application No. 16/235,557, filed on Dec. 28, 2018, now abandoned.

(51) Int. Cl.
*G06F 16/901* (2019.01)
*G06F 16/25* (2019.01)
*G06F 16/28* (2019.01)

(52) U.S. Cl.
CPC ........ *G06F 16/9024* (2019.01); *G06F 16/258* (2019.01); *G06F 16/289* (2019.01)

(58) Field of Classification Search
CPC ... G06F 16/258; G06F 16/289; G06F 16/9024
See application file for complete search history.

(56) References Cited

U.S. PATENT DOCUMENTS

| | | | |
|---|---|---|---|
| 7,317,952 B2 * | 1/2008 | Bhandiwad | G05B 19/4185 700/83 |
| 8,266,602 B2 | 9/2012 | Hodson et al. | |

(Continued)

FOREIGN PATENT DOCUMENTS

| | | |
|---|---|---|
| CN | 103108411 A | 5/2013 |
| CN | 103838921 A | 6/2014 |

(Continued)

OTHER PUBLICATIONS

Hongli, Yuan, and Liu Feng. "Research on OPC UA based on FDT/DTM and EDDL." Second International Conference on Digital Manufacturing & Automation. 2011. pp. 992-995.

(Continued)

*Primary Examiner* — Miranda Le
(74) *Attorney, Agent, or Firm* — Lempia Summerfield Katz LLC

(57) ABSTRACT

Modern industrial processes demand flexibility in terms of how data flows are structured in an automation pyramid. Instead of only upward and downward flows, the data should be accessible directly at each level of the pyramid. A gateway for facilitating an integration of process equipment within an industrial environment supporting an open industry standard is provided. Integration of field devices having characteristics, capabilities, and/or requirements that are expressed by a description language for industrial process equipment such as EDDL, into a contemporary communication environment enabling a direct data access, is sup- (Continued)

ported. The communication environment is operated based on a semantically enriched and graph-based data information model such as provided by OPC UA.

9 Claims, 6 Drawing Sheets

(56) References Cited

U.S. PATENT DOCUMENTS

| | | | | |
|---|---|---|---|---|
| 8,984,533 | B2* | 3/2015 | Bezdicek | G05B 19/4185 |
| | | | | 719/314 |
| 9,729,580 | B2* | 8/2017 | Mattes | H04L 63/20 |
| 10,095,208 | B2* | 10/2018 | Vetter | G05B 19/042 |
| 2007/0078540 | A1* | 4/2007 | Bump | G05B 19/41845 |
| | | | | 700/90 |
| 2007/0280286 | A1* | 12/2007 | Hodson | H04L 67/12 |
| | | | | 370/328 |
| 2011/0320187 | A1 | 12/2011 | Motik | |
| 2014/0040431 | A1* | 2/2014 | Rao | G06F 16/2282 |
| | | | | 709/219 |
| 2018/0113573 | A1 | 4/2018 | Kulus | |
| 2018/0203709 | A1 | 7/2018 | Busser | |

FOREIGN PATENT DOCUMENTS

| | | |
|---|---|---|
| CN | 105278960 A | 1/2016 |
| CN | 107423054 A | 12/2017 |
| CN | 107454092 A | 12/2017 |
| CN | 107836081 A | 3/2018 |
| CN | 107976965 A | 5/2018 |
| CN | 108459574 A | 8/2018 |
| EP | 1876553 A1 | 1/2008 |
| KR | 20110054370 A | 5/2011 |
| KR | 20150052538 A | 5/2015 |
| WO | 2012079946 A1 | 6/2012 |

OTHER PUBLICATIONS

Huang, Renjie, and Feng Liu. "Research on OPC UA based on electronic device description." 2008 3rd IEEE Conference on Industrial Electronics and Applications. IEEE, 2008. pp. 2162-2166.

Li, Qiao, and Feng Liu. "The future of the device integration: Field device integration." 2011 IEEE 2nd International Conference on Software Engineering and Service Science. IEEE, 2011. pp. 687-690.

Nsiah, Kofi Atta, et al. "An open-source toolkit for retrofit industry 4.0 sensing and monitoring applications." 2018 IEEE International Instrumentation and Measurement Technology Conference (I2MTC). IEEE, 2018. pp. 1-6.

PCT International Search Report and Written Opinion of International Searching Authority mailed Mar. 17, 2020 corresponding to PCT International Application No. PCT/EP2019/082917.

Van Tan, Vu, Dae-Seung Yoo, and Myeong-Jae Yi. "Device integration approach to opc ua-based process automation systems with fDT/DTM and eDDL." International Conference on Intelligent Computing. Springer, Berlin, Heidelberg, 2009. pp. 1001-1012.

Feng Liu et al.; "Application research on multi-fieldbus OPC server based on EDDL"; Feb. 15, 2009, with English translation. pp. 1-16.

\* cited by examiner

GATEWAY AND METHOD FOR TRANSFORMING A DESCRIPTION OF AN INDUSTRIAL PROCESS EQUIPMENT INTO A DATA INFORMATION MODEL

This application is the National Stage of International Application No. PCT/EP2019/082917, filed Nov. 28, 2019, which claims the benefit of U.S. patent application Ser. No. 16/235,557, filed Dec. 28, 2018. The entire contents of these documents are hereby incorporated herein by reference.

TECHNICAL FIELD

The present embodiments relate to a gateway for transforming a description of an industrial process equipment into a data information model. More specifically, the present embodiments relate to a transformation of a description of industrial process equipment into a semantically enriched and graph-based data information model for automation purposes.

BACKGROUND

Industrial automation system components of the past have traditionally been interconnected by specialized networks using a variety of different protocols for access and data exchange.

The development of present and future automation systems and field devices has put considerable focus on common industry standards aiming for a standardized access to process data in order to reduce the effort for device-engineering, configuration, management, operation, and versioning, as well as enable applications that are based on integration and processing of the process data.

An Open Platform Communications Unified Architecture, or OPC UA, provides an architecture for the integration of field devices. OPC UA is an industrial standard protocol of the OPC Foundation for manufacturer-independent communication with the purpose of interchanging industrial data (e.g., in process automation).

Many field devices of today, however, are described by alternative approaches such as a description language entitled Electronic Device Description Language, or EDDL. Accordingly, there is a need in the art to facilitate an integration of process equipment described by a description language according to a different description scheme data within an industrial environment of process equipment described by open industry standards such as OPC UA.

SUMMARY AND DESCRIPTION

Embodiments herein generally involve a gateway for facilitating an integration of process equipment within an industrial environment supporting an open industry standard such as OPC UA.

In one embodiment, a gateway for transforming a description of an industrial process equipment into a semantically enriched and graph-based data information model for automation purposes is disclosed. The gateway includes a parsing module for parsing information entities in the description of the industrial process equipment by a field communication protocol and for transforming the parsed information entities into declarative logic facts and asserting the declarative logic facts within a deductive database. The gateway further includes a knowledge engine using a mapping knowledge base for applying mapping rules to the declarative logic facts, whereby the declarative logic facts are deductively mapped onto the graph-based data information model. Eventually, the gateway includes an interface module for accessing the graph-based data object model.

Although there are many alternative formalisms for declarative logic facts (e.g., a formalism based on W3C OWL), the usage of Datalog is regarded as superior for a deployment on resource constrained devices.

BRIEF DESCRIPTION OF THE DRAWINGS

The objects as well as further advantages of the present embodiments will become more apparent and readily appreciated from the following description of embodiments, taken in conjunction with the accompanying drawing in which.

DETAILED DESCRIPTION

Industrial processes are complex as industrial processes involve technologies of different fields, ranging from mechanics, electronics, communication, and computer science. Further, different systems play different roles in industrial processes, ranging from field devices, control devices, manufacturing execution systems, and enterprise management systems.

Figure 1:
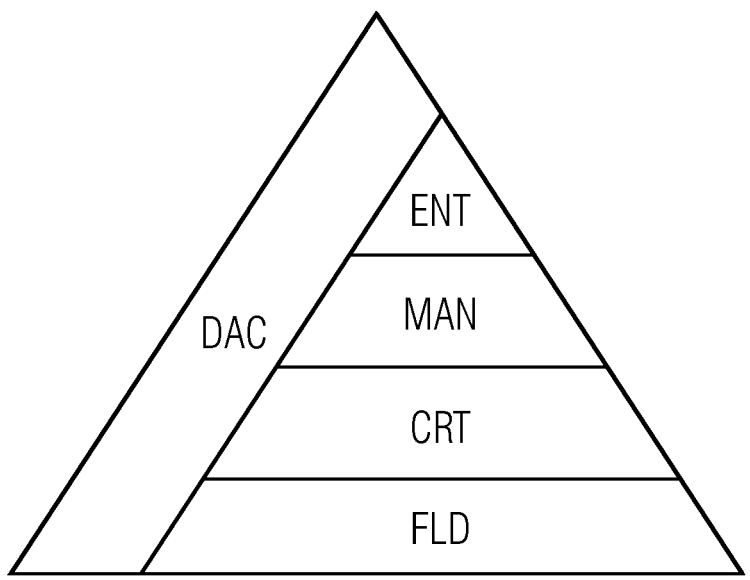
FIG. 1 shows a hierarchically layered architecture of manufacturing control in an industrial automation domain.

Until today, industrial processes are categorized by a Automation Pyramid. A right part of FIG. 1 shows such a hierarchically layered Automation Pyramid, where: a first level or field level FLD includes physical field devices such as actuators and sensors; a second control level CRT includes control devices such as Programmable Logic Controllers or PLCs; a third manufacturing level MAN includes manufacturing execution systems; and a top enterprise level ENT of the pyramid includes an enterprise management system.

A data flow is structured by these well-defined layers FLD, CRT, MAN, ENT, such that data flows upwards from individual field devices to the enterprise level via control supervision and manufacturing execution systems. In the same vein, data flows from enterprise systems flows downwards to field devices.

Modern industrial processes, however, demand flexibility in terms of how data flows are structured in the automation pyramid. Instead of only upward and downward flows, the data should be accessible directly at each level of the pyramid. This direct access by each of the layers of the pyramid is symbolized by an oblique layer DAC on the left side of FIG. 1, which is configured for a cross-layered data access in all levels FLD, CRT, MAN, ENT of the automation pyramid.

A protocol of choice for enabling a cross-layered data access is OPC UA. OPC UA (Open Platform Communications Unified Architecture) is an industrial standard protocol of the OPC Foundation for manufacturer-independent communication with the purpose of interchanging industrial data (e.g., in process automation).

OPC UA offers direct data access, regardless of the level of the automation pyramid. OPC UA further provides an information model and transport layer communications, where clients at any level of the pyramid may directly access data served by one or more OPC UA servers, hosted at any level. This includes OPC UA servers hosted at the field device level. OPC UA imposes a prerequisite in that information of heterogeneous automation devices and systems is to be represented with the OPC UA Information Model (OPC UA IM), which is a semantically enriched and graph-based data information model for automation purposes.

Current field devices in an environment of a current automation systems, however, are predominantly operated by a differing description language for industrial process equipment. One prevalent description language in the industrial domain is EDDL or Electronic Device Description Language. Until today, EDDL is a widely used standard in the process industry. As EDDL is nothing more but a structured listing of parameters, characteristics, capabilities, and/or requirements of a device, direct data access of EDDL described devices interfacing servers operated based on a semantically enriched and graph-based data information model for automation purposes is not possible at present.

It is therefore an object of the proposed embodiments to support an integration of field devices, or process equipment in general, having characteristics, capabilities, and/or requirements that are expressed by a description language for industrial process equipment such as EDDL, into a contemporary communication environment enabling a direct data access. The communication environment is operated based on a semantically enriched and graph-based data information model such as provided by OPC UA.

More specifically, the problem is how to make information from»brownfield«devices available in the address space of an OPC UA server. The term brownfield refers to state-of-the-art-devices operated by a legacy description language that are to be deployed in a more contemporary environment. EDDL is not the only example of such legacy description languages. There are a number of other device description languages implemented on brownfield devices that are to be integrated into a communication environment for facilitating a direct data access. Legacy description languages include languages or protocols such as Field Device Tool/Device Type Manager (FDT/DTM), General Station Description (GSD), IO Device Description, etc. It is an object of the proposed embodiments to support an integration of field devices operated by such legacy description languages of any kind.

In existing automation systems, information from field devices is typically accessible via a controller for controlling these field devices. This control is localized on the field level FLD or at the control level CRT according to FIG. 1. The control is typically performed during an engineering process, where automation system parameters of field devices are set and exposed over a controller.

Such Controllers may then assist to export this information to an OPC UA server located on higher levels of the automation pyramid. In this way, information from field devices may be indirectly accessible by a server and may be used further above at different levels of the automation pyramid.

For many applications, however, it is desirable not to access field information by an intermediate controller. These applications include added-value applications (e.g., applications related to monitoring, management, and optimization of field level assets). The reason for favoring a direct access of field information over an indirect access by an intermediate controller is due to a design principle of dedicating a controller solely for enduring system stability. For other applications, it is desirable to access the field device information aside form the core control, possibly in a cheap and flexible way.

The present embodiments generally propose a gateway for transforming a description of industrial process equipment into a semantically enriched and graph-based data information model for automation purposes with the goal of enabling industrial process equipment such as brown-field field devices to be used in modern industrial applications.

The gateway includes a knowledge-based mapping system and allows for a connection to one or more process equipment (e.g., field devices) in order to collect information from each field device, and exchanging this information with a server or an application based on a semantically enriched and graph-based data information model for automation purposes, such as OPC UA. For the»upward«exchange of information (e.g., exchange with a server or an application based on a semantically enriched and graph-based data information model), the gateway includes an interface module for accessing the graph-based data information model. This interface module may be embodied by an OPC UA server operated by and/or on the gateway, such as a gateway-internal OPC UA server.

Figure 2:
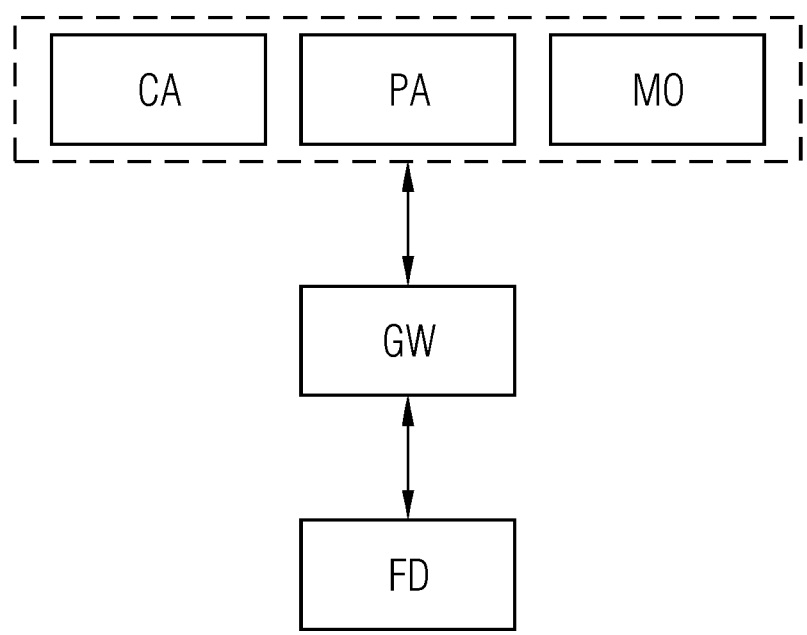
FIG. 2 shows a block diagram of functional units for exchanging data within an automation control system.

FIG. 2 shows a proposed gateway GW connected to one field device FD, or, alternatively, to one or more industrial process equipment FD of any kind, and communicating information collected from the description of the industrial process equipment FD to one or more applications, such as a cloud-based application CA, a portable application PA, and/or an application MO for asset-monitoring, management, and/or optimization. The applications CA, PA, MO may access the description (not shown) of the industrial process equipment FD over a standard OPC UA server provided by the interface module (not shown) of the gateway GW.

Figure 3:
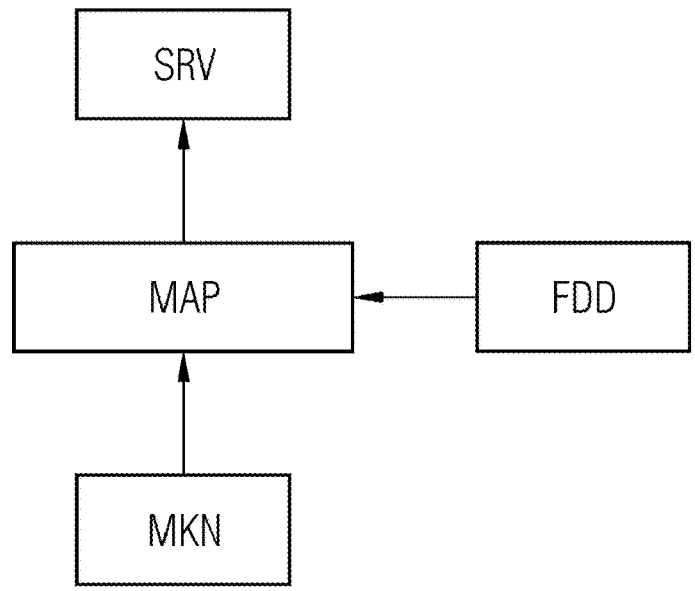
FIG. 3 shows a block diagram of basic functional units of a gateway according to an embodiment.

Referring now to FIG. 3, the knowledge-based mapping MAP of the gateway is detailed as an intermediary model between an input delivering a conventional or legacy field device description FDD (e.g., expressed by the description language EDDL), mapping information from the description to a graph-based data information model, and allocating the data information model by a gateway-internal server SRV. For the process of knowledge-based mapping MAP, a mapping knowledge base MKN, the details of which will be described further below, is used.

The gateway acts in a plug-and-play fashion (e.g., connects to the field device FD, reads the field device description FDD, and maps field device information such as device parameters to an OPC UA address space). Device parameters and corresponding values may then be accessed by the gateway-internal server SRV using any standard OPC UA client (not shown) or any standard OPC UA server (not shown) connected to the gateway-internal server SRV.

A mapping of information models according to the present embodiments is performed using one or more declarative logic rules or facts for applying a deductive inference mechanism. In the following, a deductive inference method is described using Datalog as one exemplary programming language for expressing the declarative logic rules.

A Datalog language section, also referred to as a Datalog program, consists of declarative rules. A rule has a rule body and a rule head, which is expressed as:

$$head <= body$$

If a Datalog system may proof that body is TRUE, as a Boolean TRUE, then the Datalog system may infer that the head is TRUE as well. This is a mechanism how a Datalog system may derive new knowledge from existing knowledge.

Further on, Datalog programs and Datalog rules are built up from atomic formulas of a type:

$$p(t1, t2, \ldots, tn)$$

where p is a predicate symbol and t1, t2, . . . , tn denote terms. Some predicates have predefined meaning in a Datalog system. The predicates denote a built-in operation, and thus, are referred to as built-in predicates. In anticipation of embodiments to be described further below, built-in predicates and compound terms may be used to handle external calls or functions, which may be used to map Electronic Device Description Language (EDDL) methods and commands into OPC UA methods. Further, built-in predicates and compound terms may be used to call or execute methods and commands specified in an Electronic Device Description (EDD).

Returning back to the description of Datalog, an atomic formula (e.g., an atom) is a formula that cannot be divided into strict sub-formulas. Literals are positive or negative atoms. Terms are constants, variables, or compound terms. Variables are denoted with strings consisting of capital letters or beginning with a capital letter (e.g., VAR or Var), and constants are quoted (e.g., "constant_unit"). Compound terms implement functions.

A function is an expression of a type:

$$f(t1, t2, \ldots, tn)$$

where f is a function symbol of arity n, and t1, t2, . . . , tn are terms.

A fact is a ground atomic formula, for example, expressed by:

$$p("c1", "c2", \ldots, "cn")$$

where "c1", "c2", . . . , "cn" are constants.

Figure 4:
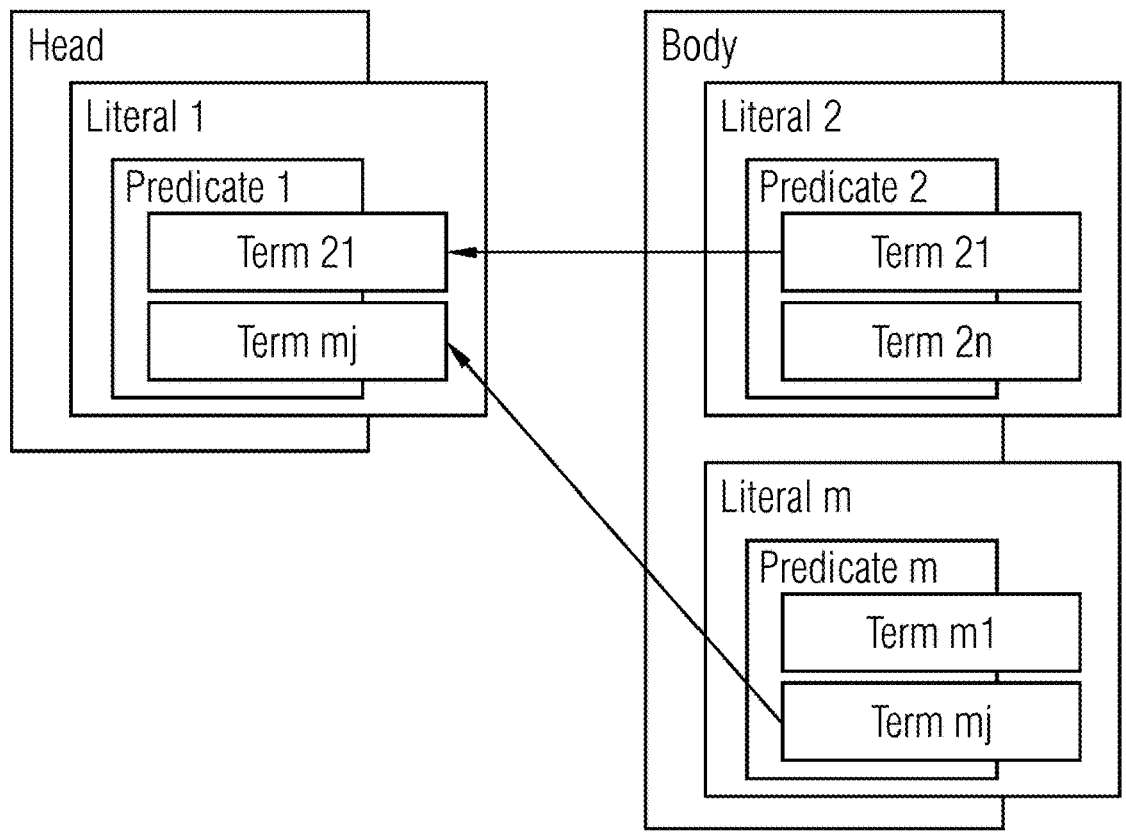
FIG. 4 shows a graphical representation of a declarative logic rule applied to declarative logic facts.

FIG. 4 shows a graphical representation of a declarative logic rule applied to declarative logic facts with the aim of mapping data from one information model to another.

Terms in the Body literal (right side of FIG. 4) may be related to terms in the head atom (left side of FIG. 4). In this case, upon input of a single fact matching the structure of the body literal, a Datalog fact will be deduced using the inputted fact and the existing Datalog rule.

Datalog rules may be constructed such that the Datalog rules recursively work with each other to populate complete mapping rules using many individuals, and smaller Datalog rules that define information relationships. As such, in the example, a new Datalog fact with the format of the rule head will be asserted into the database if there are literals matching the body literals' constant terms with the terms also being satisfied as wildcards.

In the following, a Representation of OPC UA Information in Datalog is described. Compound names with one or more medial capitals (e.g., a compound name»TypeDefinitionNodes«) are used to refer to authoritative names used in the specification»OPC Unified Architecture«of the OPC Foundation. These authoritative names are assumed to be known and for a person skilled in the art. Hereinafter, these authoritative names are, therefore, introduced without explanation.

The OPC UA specification includes nine OPC UA node classes, including a Base Node class. Each of these node classes has standardized attributes that are stored directly within the node. Each of these node classes may be stored in Datalog using the predicate to specify the node class.

For the exemplary OPC UA class»ReferenceType«, three attributes are specified by the OPC UA standard, namely:

TABLE 1

| Attribute Name | Use | Type |
| --- | --- | --- |
| IsAbstract | Mandatory | Boolean |
| Symmetric | Optional | Boolean |
| InverseName | Optional | LocalizedText |

These three attributes may be stored as an atomic formula by using the three terms in a semantic order along with the unique node ID that explicitly references the node to be stored. The respective representation of the OPC UA class»ReferenceType«as an atomic formula in Datalog is then:

$$opc\_ReferenceType(NodeID, IsAbstract, Symmetric, InverseName).$$

An example of storing a ReferenceType node by a Datalog formalism having an OPC UA namespace ID that is 1, is an abstract type, not symmetric, and does not have an inverse name would be as follows:

$$opc\_ReferenceType(1, true, false, NULL).$$

A feasible utilization of Datalog in defining relational rules for mapping the facts' term semantics into different facts' semantics may be provided, thereby mapping one information model to another, all within a same Datalog database.

While one may create very large collections of top-level mapping rules that may handle entire information models, such creation may result in a large number of mapping rules, thereby neglecting usage of the deductive power of Datalog. This deductive power of Datalog, however, allows for fewer mapping rules, as smaller components of an information model may be mapped using rules that are then utilized by higher level rules in a deductive manner. Mapping rules are thus structured in a hierarchical fashion so as to utilize a reusability of rules. This construction of mapping rules is similar to the art of programming functions used for a modularization of program code, where a function is referred to by a multitude of higher-level function calls rather than being repeatedly coded within the higher level. Unlike programming functions being rather procedural statements, Datalog rules are rather declarative statements, which provides that the Datalog rules may be interpreted regardless of a position in a program.

In the following, a mapping of EDD Information to an OPC UA information model, or OPC UA IM, is described. An exemplary EDDL variable in an EDD file is considered as follows:

MANUFACTURER 66,
DEVICE_TYPE 0x070E,
DEVICE_REVISION 1,

```
DD_REVISION 1
VARIABLE DEMO_Temperature_Sensor
{
  LABEL DEMO_Temperature_Sensor
  HELP measures_actual_temperature;
  CLASS CONTAINED;
  TYPE FLOAT;
  {
    DEFAULT_VALUE
  }
  HANDLING READ & WRITE;
}
```

In order to accomplish a mapping of the above shown EDD information into an OPC UA information model, a mapping of typical EDD file attributes is done in a first act, which is followed by an act of mapping the variable itself.

As each EDD file has four top level attributes, manufacturer ID, device type, device revision, and the device description revision, see first four lines in the EDDL code shown above, there are four OPC UA property nodes to be attached to the top-level object node representing the EDD file.

Each property node is constructed from a Variable node that is referenced from its parent object by a reference entitled»HasProperty«. Variables are defined using the Variable node class. Two types of variables in OPC UA IM are defined: properties and data variables. The Variable node is always part of at least one other node.

Figure 5:
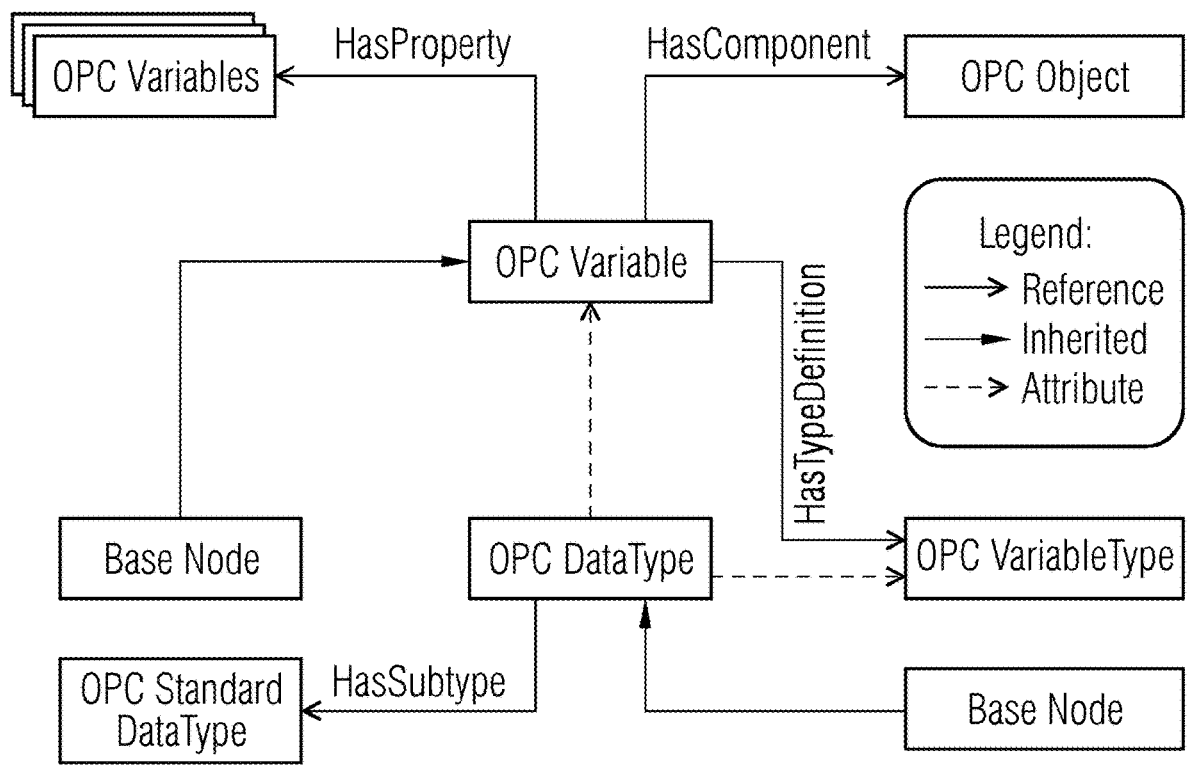
FIG. 5 shows a model structure for modelling a generic variable in a graph-based data information model.

FIG. 5 shows the resulting model structure modelling the generic variable and top-level attributes of a general EDD file in the graph-based data information model of OPC UA.

In the following, a mapping of an EDDL variable in the structure of an EDDL variable to an address space of the OPC UA information model is described.

A variable typically describes parameters contained in a field device or in an EDD application. A Datalog atomic formula representing an EDDL variable is expressed by:

eddl_Variable(
    EDDL_ID, EDDL_ID_1, EDDL_ID_2, EDDL_ID_3, EDDL_ID_4, EDDL_ID_5, EDDL_ID_6,
    EDDL_VariableName, EDDL_CLASS, EDDL_LABEL, EDDL_TYPE, EDDL_CONSTANT_UNIT,
    EDDL_DEFAULT_VALUE, EDDL_HANDLING, EDDL_HELP, EDDL_INITIAL_VALUE,
    EDDL_POST_EDIT_ACTIONS,
    EDDL_POST_READ_ACTIONS, EDDL_POST_WRITE_ACTIONS,
    EDDL_PRE_EDIT_ACTIONS, EDDL_PRE_READ_ACTIONS, EDDL_PRE_WRITE_ACTIONS,
    EDDL_READ_TIMEOUT, EDDL_REFRESH_ACTIONS,
    EDDL_RESPONSE_CODES, EDDL_STYLE,
    EDDL_VALIDITY, EDDL_WRITE_TIMEOUT).

According to an Industry Standard Specification entitled»IEC 62769-109-1:2015—Field Devices Integration (FDI)—Part 109-1: Profiles-HART and WirelessHART«the description of attributes of an EDDL variable is specified as:
  EDDL_ID-UAObject node ID;
  EDDL_ID_1-variable node ID;
  EDDL_ID_2-variableType node ID;
  EDDL_ID_3-OPC_DataType node ID;
  EDDL_ID_4-node ID for variable EDDL_CONSTANT_UNIT;
  EDDL_ID_5-node ID for variable EDDL_STYLE;
  EDDL_ID_6-node ID for variable EDDL_VALIDITY;
  EDDL_VariableName-specifies identifier of a variable;
  EDDL_CLASS-specifies how the variable is used by the device and the EDD application for organization purposes and display;
  EDDL_LABEL-specifies the displayed designation of an element;
  EDDL_TYPE-specifies the data type of a variable;
  EDDL_CONSTANT_UNIT—is used if a variable has a units code that never changes;
  EDDL_DEFAULT_VALUE-specifies the default setting for the variable;
  EDDL_HANDLING-specifies the operations that may be performed on an element;
  EDDL_HELP-specifies text that provides a description of the construct;
  EDDL_INITIAL_VALUE-specifies the value of a variable that is displayed when a device is instantiated for the first time;
  EDDL_POST_EDIT_ACTIONS-specifies methods that are to be executed after the variable has been written to the device;
  EDDL_POST_READ_ACTIONS-specifies methods that are to be executed after the variable was read from the device;
  EDDL_POST_WRITE_ACTIONS-specifies methods that are to be executed after the variable has been written to the device;
  EDDL_PRE_EDIT_ACTIONS-specifies methods that are to be executed immediately when the variable is going to be edited;
  EDDL_PRE_READ_ACTIONS-specifies methods that are to be executed before the variable is read;
  EDDL_PRE_WRITE_ACTIONS-specifies methods that are to be executed before the variable is written to the device;
  EDDL_READ_TIMEOUT-specifies the length of time, in ms, the EDD application is to wait for the returned variable;
  EDDL_REFRESH_ACTIONS-specifies EDD methods that are to be executed whenever the variable is displayed or refreshed;
  EDDL_RESPONSE_CODES-specify values a device may return as error information;
  EDDL_STYLE-specifies the way a variable is displayed;
  EDDL_VALIDITY-specifies whether an element is valid or invalid; and
  EDDL_WRITE_TIMEOUT-specifies the length of time, in ms, an EDD application is to wait for confirmation that the variable is successfully written to the device.

The leading seven variables, EDDL_ID, EDDL_ID_1, EDDL_ID_2, EDDL_ID_3, EDDL_ID_4, EDDL_ID_5, and EDDL_ID_6, are used as placeholders for certain OPC UA node identifiers or IDs.

In the following, a mapping of an EDDL variable to a variable in the OPC UA information model is described. A Datalog atomic formula representing an OPC UA variable is specified as:

opc_UA Variable(
    OPC_NodeId, OPC_Value, OPC_DataType, OPC_ValueRank,
    OPC_ArrayDimensions, OPC_IsAbstract, OPC_AccessLevel,
    OPC_UserAccessLevel, OPC_MinSamplingInterval, OPC_Historizing)

According to an Industry Standard Specification entitled»OPC UA Part 5-Information Model RC 1.04.15 Specification«the description of attributes of the OPC UA Base Node class is specified as:

OPC_NodeId—a node identifier in the address space of an OPC UA server;

OPC_NodeClass—identifies the class of a node;

OPC_BrowseName—specifies a non-localized human-readable name of a node;

OPC_DisplayName—specifies the localized name of the node (used to display the name of the node to the user);

OPC_Description—optional description to explain the meaning of the node;

OPC_WriteMask—specifies possibility of a client to write attributes of the node; and OPC_UserWriteMask—optionally specifies possibility of a client to write attributes of the node taking user access rights into account.

The following Datalog rule will create an OPC UA Base Node Class with certain attributes taken from the corresponding EDDL variable:

opc_BaseNodeClass(
    EDDL_ID_1, "UAVariable", EDDL_VariableName, EDDL_LABEL, EDDL_HELP, "Not_Used", "Not_Used")
    <=eddl_Variable.

This rule defines a base node for an OPC UA variable by the term:

<=eddl_Variable

Further, the variable in the OPC UA information model has an ID specified as»EDDL_ID_1«. Browse name, display name, and the description is respectively mapped to corresponding EDDL variable values (e.g., EDDL_VariableName, EDDL_LABEL, EDDL_HELP, respectively). WriteMask and UserWriteMask are not set in the example above.

In the following, a definition of an OPC UA Variable Type Node Class is described. Defining an OPC Variable Type (see box with the same name in FIG. 5) for an OPC Variable (see box with the same name in FIG. 5) is a common practice.

The signature of a variable type is represented with the following Datalog atomic formula:

opc_UA VariableType (OPC_NodeId, Default Value, DataType, ValueRank, ArrayDimensions, IsAbstract).

Consequently, a default value of the variable, see the second term»DefaultValue«in the signature of the formula above, is specified. The following rule creates an OPC UA variable type by mapping the default value from a corresponding EDDL variable, namely EDDL_DEFAULT_VALUE:

opc_UA VariableType(
    EDDL_ID_2, EDDL_DEFAULT_VALUE, EDDL_ID_3, "-1", "Not_Used", "Not_Used")
    <=eddl_Variable.

For identifiers OPC_NodeId and OPC_DataType, EDDL_ID_2 and EDDL_ID_3 are used respectively.

Consequently, opc_BaseNodeClass for opc_UA Variable-Type is to be created too. The same rule as shown above may be used for this purpose. Only the identifier and the type (UAVariableType instead of UA Variable) are to change:

opc_BaseNodeClass(
    "EDDL_ID_2", "UAVariableType", EDDL_VariableName, EDDL_LABEL, EDDL_HELP, "Not_Used", "Not_Used")
    <=eddl_Variable.

The following section describes a creation of an OPC UA Data Type Class. Data type of an OPC UA variable may be specified with a following Datalog atomic formula:

*opc*_DataTypeNode(*OPC*_NodeId,*OPC*_IsAbstract).

For the exemplary variable used before the following rule creates an OPC UA DataTypeNode:

opc_DataTypeNode (EDDL_ID_3, "Not_Used")
    <=eddl_Variable.

Optionally, if an opc_BaseNodeClass for opc_DataTypeNode is to be created, the same rule as shown above may be used. Only the identifier and the type (UADataType) are to change.

The following section describes a creation of an OPC UA Variable Node Class: EDDL_CONSTANT_UNIT. The signature of eddl_Variable has a term referred to as EDDL_CONSTANT_UNIT. This term from an EDDL variable is to be mapped to an OPC UA Property, which is a type of an OPC UA Variable:

opc_UAVariable(
    EDDL_ID_4, EDDL_CONSTANT_UNIT, "String", "-1", "Not_Used", "Not_Used", "Not_Used", "Not_Used", "Not_Used")
    <=eddl_Variable.

The data type»String«above has its code in the OPC UA information model. Often the code is used in an OPC UA address space to denote a string.

The Class»BaseNodeClass«of the property is created by the following rule:

opc_BaseNodeClass(
    "EDDL_ID_4", "UAVariable", "CONSTANT_UNIT", "CONSTANT_UNIT", "Not_Used", "Not_Used", "Not_Used")
    <=eddl_Variable.

The following section describes a creation of an OPC UA Variable Node Class: EDDL_STYLE. The signature of eddl_Variable has a term referred to as EDDL_STYLE. This term from an EDDL variable is to be mapped to an OPC UA Property, which is a type of an OPC UA Variable:

opc_UAVariable(
    EDDL_ID_5, "EDDL_STYLE", "String", "-1", "Not_Used", "Not_Used", "Not_Used", "Not_Used", "Not_Used")
    <=eddl_Variable.

The BaseNodeClass of the property is realized with the following rule:

opc_BaseNodeClass(
    "EDDL_ID_5", "UAVariable", "STYLE", "STYLE", "Not_Used", "Not_Used", "Not_Used")
    <=eddl_Variable.

The following section describes a creation of an OPC UA Variable Node Class: EDDL_VALIDITY. The signature of eddl_Variable has a term called EDDL_VALIDITY. This term from an EDDL variable is to be mapped to an OPC UA Property, which is a type of an OPC UA Variable:

opc_UAVariable(
    EDDL_ID_6, "EDDL_VALIDITY", "String", "-1", "Not_Used", "Not_Used", "Not_Used", "Not_Used", "Not_Used")
    <=eddl_Variable.

The BaseNodeClass of the property can be realized with the following rule.

opc_BaseNodeClass(
    "EDDL_ID_6", "UAVariable", "VALIDITY", "VALIDITY", "Not_Used", "Not_Used", "Not_Used")
    <=eddl_Variable.

As mentioned above, actions in EDD, such as POST EDIT ACTIONS, POST READ ACTIONS, POST WRITE ACTIONS, PRE EDIT ACTIONS, PRE READ ACTIONS, PRE WRITE ACTIONS, etc. may be mapped to OPC UA IM by using Datalog built-in predicates and compound terms. Since they may be used to handle external calls or functions, they may also be used to map EDD actions into OPC UA methods, as well as to call or execute methods and commands specified in an EDD.

The following section describes a creation of an OPC UA Object node. The EDD file attributes of the created OPC UA Object node, such as manufacturer ID, device type, device revision, and the device description revision, serve as reference. The OPC UA Object node is realized with the following rule:

opc_UAObject (EDDL_ID)
<=
eddl_FileInformation(
EDDL_ID, EDDL_ID_1, EDDL_ID_2, EDDL_ID_3, EDDL_ID_4, EDDL_ID_5, EDDL_MANUFACTURER, EDDL_DEVICE_TYPE, EDDL_DEVICE_REVISION, EDDL_DD_REVISION).

The rule body for creating the OPC UA Object node is apparently differing from other rule bodies. Terms in eddl_FileInformation have the following meaning according to a specification defining EDDL and entitled»IEC 61804-3: Function blocks (FB) for process control, Part 3: Electronic Device Description Language (EDDL) «

EDDL_ID-UAObject node ID;
EDDL_ID_1-UAObjectType node ID;
EDDL_ID_2-node ID for variable EDDL_MANUFACTURER;
EDDL_ID_3-node ID for variable EDDL_DEVICE_TYPE;
EDDL_ID_4-node ID for variable EDDL_DEVICE_REVISION;
EDDL_ID_5-node ID for variable EDDL_DD_REVISION;
EDDL_MANUFACTURER-identifies the manufacturer;
EDDL_DEVICE_TYPE-specifies an identifier for the device type, as defined by the manufacturer of the device;
EDDL_DEVICE_REVISION-specifies a unique code for the device revision of the field device, as defined by the manufacturer; and
EDDL_DD_REVISION-specifies a unique code for the EDD revision of this device, as defined by the manufacturer.

An inherited base node class for the OPC UA Object node is realized with the rule:
opc_BaseNodeClass(
"EDDL_ID", "UAObject", "EDD DOCUMENT", "EDD DOCUMENT", "Not_Used", "Not_Used", "Not_Used")
<=eddl_FileInformation.

For the sake of readability, the term
eddl_FileInformation
hereinafter replaces the complete atomic formula:
eddl_FileInformation (EDDL_ID, EDDL_ID_1, EDDL_ID_2, EDDL_ID_3, EDDL_ID_4, EDDL_ID_5, EDDL_MANUFACTURER, EDDL_DEVICE_TYPE, EDDL_DEVICE_REVISION, EDDL_DD_REVISION).

The following section describes a creation of an OPC UA ObjectType class. An OPC UA ObjectType class for the OPC UA Object node is realized with the rule:
opc_UAObjectType (EDDL_ID_1)<=eddl_FileInformation.

The following section describes a creation of an OPC UA Variable Node Class: EDDL_MANUFACTURER. The EDD file attribute»manufacturer ID«is realized with the rule:
opc_UA Variable(
EDDL_ID_2, EDDL_MANUFACTURER, "String", "-1", "Not_Used", "Not_Used", "Not_Used", "Not_Used", "Not_Used")
<=eddl_FileInformation.

An inherited base node class for the attribute»manufacturer ID«is realized with the rule:
opc_BaseNodeClass(
"EDDL_ID_2", "UAVariable", "MANUFACTURER", "MANUFACTURER", "Not_Used", "Not_Used", "Not_Used")
<=eddl_FileInformation.

Remaining variables for EDDL_DEVICE_TYPE, EDDL_DEVICE_REVISION, and EDDL_DD_REVISION are created in a substantially similar manner. A further description regarding the creation of these variables is, therefore, omitted.

Hitherto, the creation of nodes has been shown. Subsequent parts of this description will now define and elucidate how to link these nodes using references. An absence of references would result in an absence of semantic connections between nodes, and, therefore, result in an absence of an overall semantic structure.

In the exemplary EDDL variable in an EDD file as stated above, the top-level file Object is to be referenced to the top-level Objects folder in the OPC UA server, as this is the root node for an OPC UA server. As such, all top-level nodes within an information model may be direct children of this node. The reference that accomplishes this is an»Organizes«reference to an in-built node having an ID with a value of 85 or»ObjectsFolder«.

This reference is realized by:
opc_Reference ("i=85", "Organizes", EDDL_ID)<= eddl_FileInformation.

The OPC UA Reference is represented by the following Datalog atomic formula:

$$opc\_Reference(opc\_SourceNodeId, opc\_ReferenceType, opc\_TargetNodeId).$$

The attributes of the OPC UA Reference have the following meaning:
opc_SourceNodeId—a source Node ID of a reference;
opc_ReferenceType—a reference type. As specified by OPC UA IM. Possible values are: HasTypeDefinition, HasComponent, HasProperty, HasSubtype, Organizes, HasSubtype etc.;
opc_TargetNodeId—a target Node ID of a reference.

Additionally, however optionally, it is common to state that the ObjectsFolder and the top-level node are related via the»HasComponent«reference:
opc_Reference ("i=85", "HasComponent", EDDL_ID)
<=eddl_FileInformation The ObjectsFolder is then semantically linked using a HasTypeDenition reference in order to show (e.g., announce) that the ObjectsFolder contains the type definition. For example, the in-built type FolderType (i=61):
opc_Reference ("i=85", "HasTypeDefinition", "i=61")
<=eddl_FileInformation.

Further, references between the core Object and the MANUFACTURE ID property Variable node are instantiated. Similar references are instantiated for remaining properties. For example, DEVICE TYPE, DEVICE REVISION, and DD REVISION:

opc_Reference (EDDL_ID, "HasProperty", "EDDL_ID_2") <=eddl_FileInformation.
opc_Reference (EDDL_ID, "HasProperty", "EDDL_ID_3") <=eddl_FileInformation.
opc_Reference (EDDL_ID, "HasProperty", "EDDL_ID_4") <=eddl_FileInformation.
opc_Reference (EDDL_ID, "HasProperty", "EDDL_ID_5") <=eddl_FileInformation.

Additionally, however optionally, the above described variables EDDL_ID_2, EDDL_ID_3, EDDL_ID_4, and EDDL_ID_5 are referenced by BaseData VariableType ("i=63") via "HasSubtype" and "HasTypeDefinition" references. This references are expressed in a substantially similar manner as described before. A further description regarding the creation of these references is, therefore, omitted.

The core object is then related to the variable node as expressed by:
opc_Reference (EDDL_ID, "HasComponent", EDDL_ID_1) <=eddl_Variable.

The variable node has been defined via the variable type node:
opc_Reference (EDDL_ID_1, "HasTypeDefinition", EDDL_ID_2) <=eddl_Variable.

Additionally, however optionally, a "HasSubtype" reference to the BaseData VariableType ("i=63") node is added regarding EDDL_ID_2. Further, relation to the float datatype ("i=10"), of the temperature variable, is accomplished by the reference:
opc_Reference (EDDL_ID_3, "HasSubtype", "i=10") <=eddl_Variable.

Property variables, CONSTANT UNIT, STYLE, and VALIDITY, are connected with the exemplary variable node:
opc_Reference (EDDL_ID_1, "HasProperty", "EDDL_ID_4") <=eddl_Variable.
opc_Reference (EDDL_ID_1, "HasProperty", "EDDL_ID_5") <=eddl_Variable.
opc_Reference (EDDL_ID_1, "HasProperty", "EDDL_ID_6") <=eddl_Variable.

Additionally, however optionally, "HasSubtype" and "HasTypeDefinition" references are added to the BaseData VariableType ("i=63") node that is added regarding EDDL_ID_4, EDDL_ID_5 and EDDL_ID_6.

A variable in the EDD file is modeled as a separate variable object, using the basic structure as shown in FIG. 5, where the variable is based around a Variable object with accompanying property Variable nodes, VariableType node, and a simple DataType node. Accordingly, each variable in the EDD file has a number of various properties that are specific to the variable.

Figure 6:
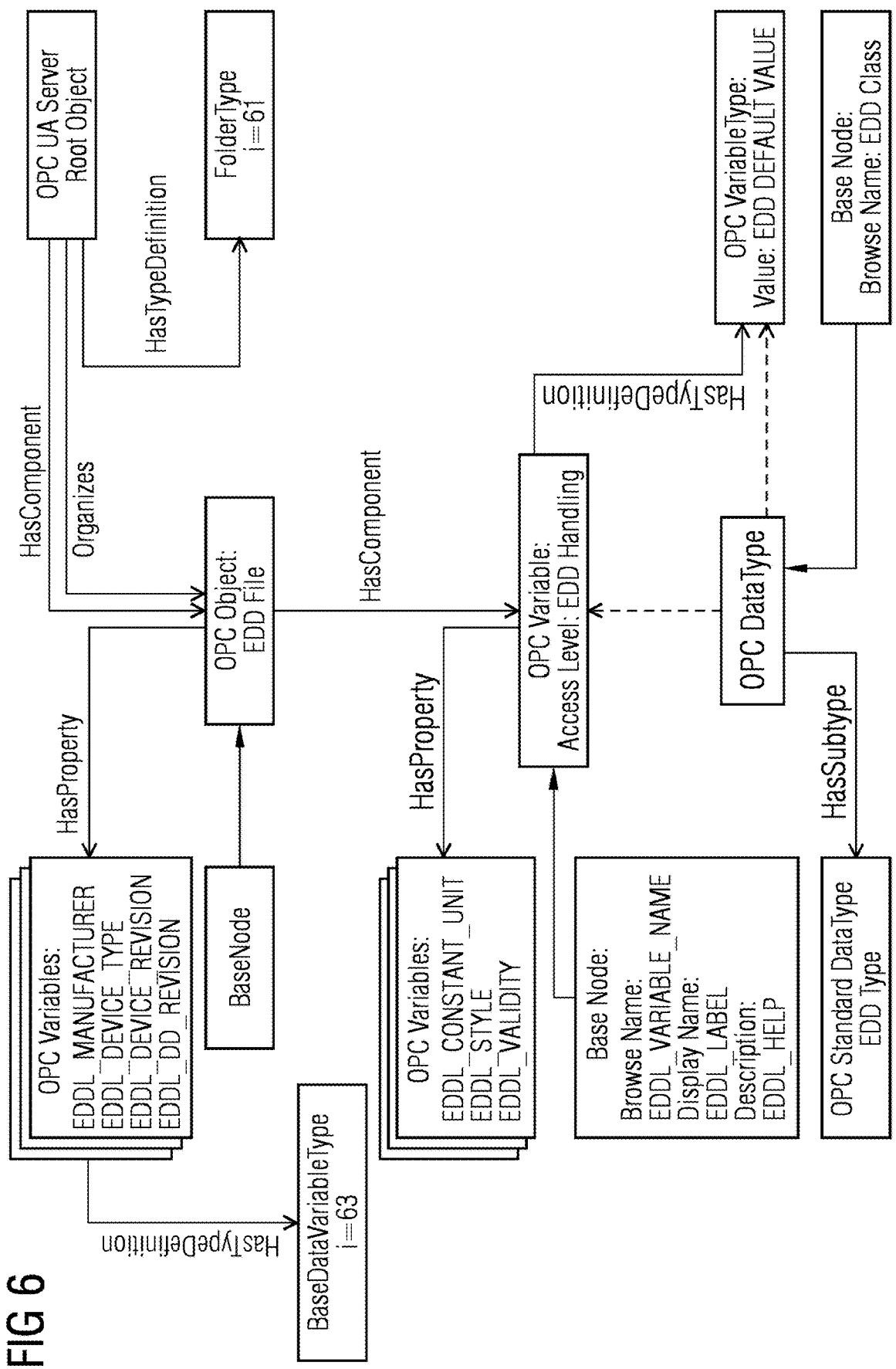
FIG. 6 shows a node structure for modelling a description of an industrial process equipment in a graph-based data information model.

FIG. 6 shows an extended information model using the standard OPC UA Information Model, and realized by Datalog rules for nodes and references as described above.

Through the use of a collection of different OPC UA nodes, it may thus be seen that it is easy to map the unique information model of an EDD file and its variables into the OPC UA IM. The mappings of an EDD variable into the OPC UA IM have been summarized up in Table 2.

TABLE 2

| | |
|---|---|
| EDDL | OPC UA |
| EDD File | OPC UA Object |
| EDD File Information | OPC UA Properties |
| EDD Variable | OPC UA Variable, VariableType and DataType |
| VARIABLE NAME | OPC UA Variable Base Node, BrowseName |
| LABEL | OPC UA Variable Base Node, DisplayName |

TABLE 2-continued

| | |
|---|---|
| HELP | OPC UA Variable Base Node, Description |
| HANDLING | OPC UA Variable AccessLevel |
| DEFAULT VALUE | OPC UA VariableType Value |
| CLASS | OPC UA DataType Base Node, BrowseName |
| TYPE | OPC UA DataType, HasSubType reference to respective OPC UA standard data type |

Figure 7:
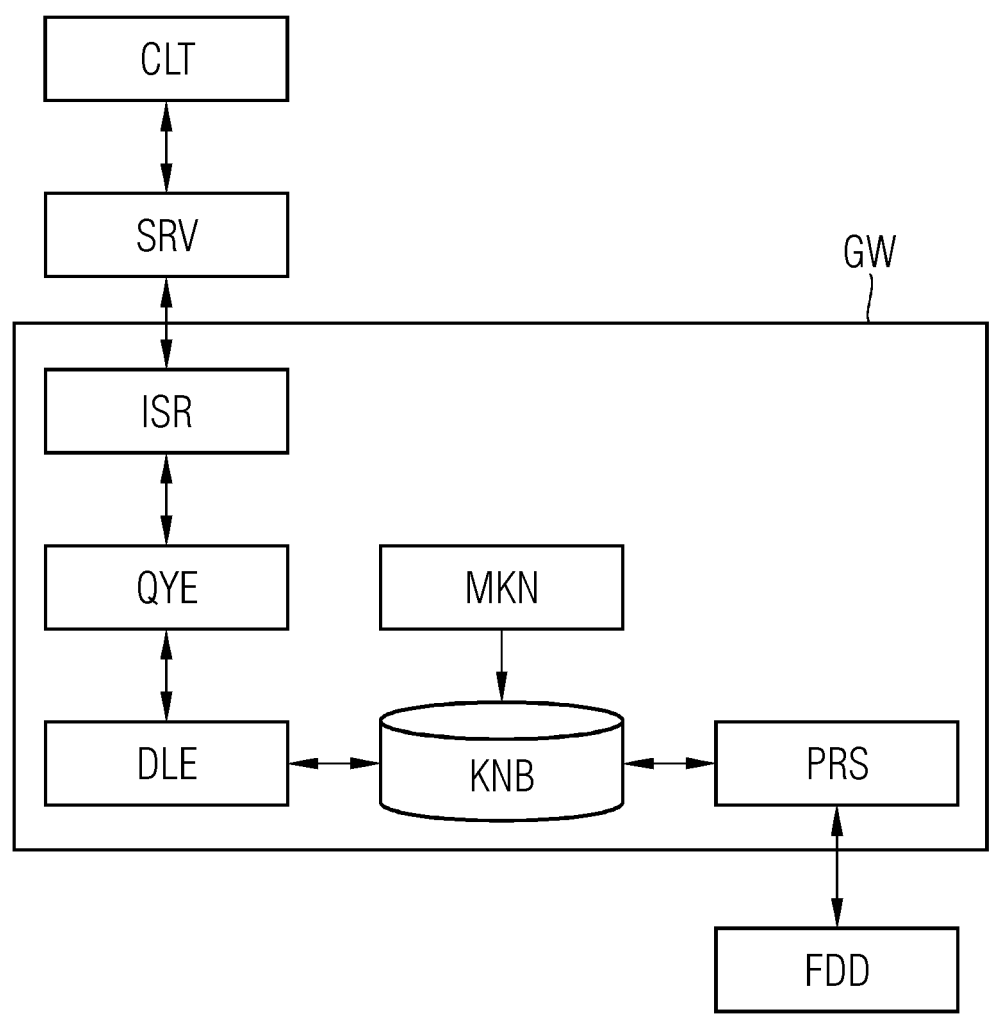
FIG. 7 shows a block diagram of a gateway according to an embodiment amongst other functional units for exchanging data within an automation control system.

The following section describes an overall system architecture and flow of data in a gateway GW according to an embodiment for transforming a field device description FDD or, more generally, a description of an industrial process equipment, into a OPC UA information model or, more generally, into a semantically enriched and graph-based data information model for automation purposes, with reference to FIG. 7.

A parsing module PRS of the gateway GW is reading a field device description FDD of a field device (not shown) or other arbitrary process equipment. The field device description FDD is stored in the field device and accessed via a field communication protocol (e.g., the well-known Highway Addressable Remote Transducer (HART) protocol).

The parsing module PRS is parsing information entities in the field device description FDD of the field device by the field communication protocol. The parsed information entities are then transformed into a data object representation (e.g., declarative logic facts) that are asserted within a deductive database or knowledge base KNB. The parsing module PRS may optionally use an accompanying asserter (not shown) for wrapping the extracted information into Datalog facts and asserting the declarative logic Datalog facts within the knowledge base KNB (e.g., Datalog database KNB). The contents of the knowledge base KNB are used for applying mapping rules or mapping knowledge MKN in general to the declarative logic facts using a Datalog Engine DLE.

The knowledge base KNB or knowledge engine KNB is not only a passively queried database but also acting in a sense of applying rules, mapping facts, etc. Depending on the implementation of a particular embodiment, the knowledge base KNB co-operates with the parsing module PRS and a Datalog Engine DLE and may include one or more of these components.

In order to map the declarative logic facts using the Datalog Engine DLE, the knowledge base KNB is loaded with Mapping Knowledge MKN. The Mapping Knowledge MKN is operated to deductively map the data objects transformed by the field device description FDD within the knowledge base KNB with a structure to allow them to be later extracted as OPC UA objects. These mapping rules are asserted before any mappings occur, such that the mapping rules are able to be applied to input information throughout the mapping process.

It has been shown how the Mapping Knowledge MKN may be operated for EDDL and OPC UA IM. Applying similar procedures, it is possible to create Mapping Knowledge MKN for another field device description model, or an extension of this one, for example, if one needs to represent EDD data over OPC UA IM with the semantics from another model (e.g., the NAMUR Open Architecture or NOA model. Applicability of this approach is thus not limited to other standard information models (e.g., IODD or IO Device Description, FDT/DTM14 or Field Device Tool/Device Type Manager, or NOA (NAMUR Open Architecture)).

Unlike most mapping systems, the functionality of the knowledge base KNB, one core of the gateway GW, has been abstracted away from the system itself. By doing so, there is a larger degree of flexibility and portability when implementing application specific mappings. By removing all mapping logic from within the source code, the flexibility of the system is bounded only by the modeling abilities of the OPC UA IM.

With the mapped EDD information stored within the Knowledge Base KNB, the information is then processed and queried in a way that this information may be extracted and eventually exposed via an gateway-internal OPC UA server ISF. These tasks are accomplished by the Datalog Engine DLE and a Query Engine QYE. The recursive querying algorithms for Datalog formalism are well known.

According to embodiments, Datalog has been chosen as a formalism to implement the proposed mapping method due to the of efficiency of Datalog algorithms and corresponding suitability on even resource constraint devices (e.g., non-expensive IoT devices (Internet of Things) and IoT gateways).

Figure 8:
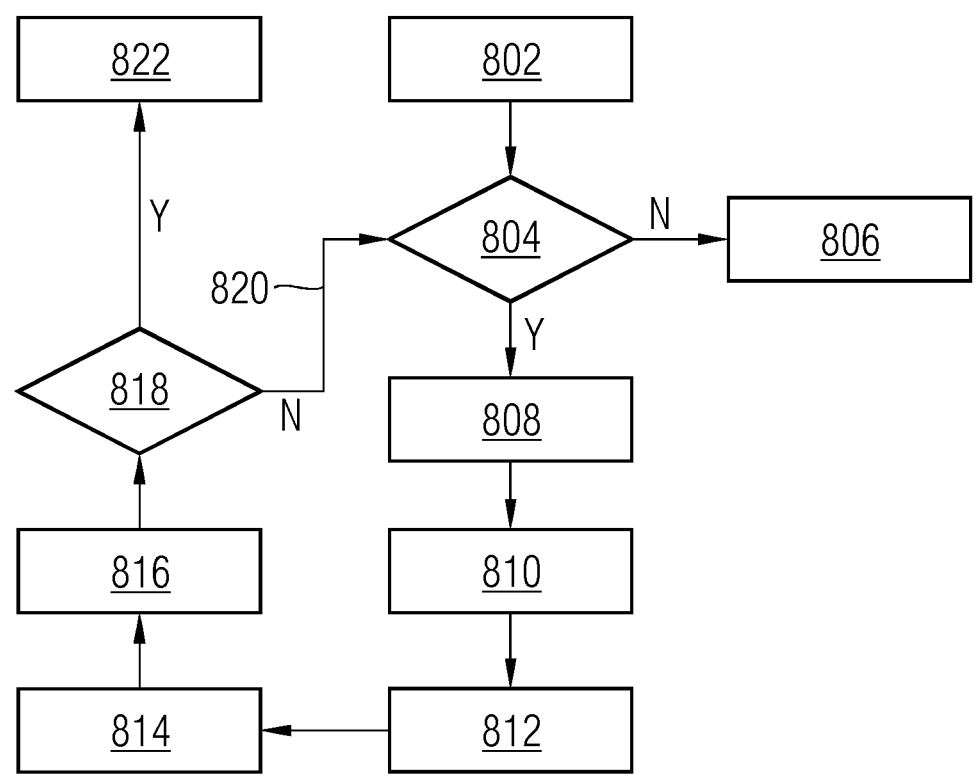
FIG. 8 shows a diagram illustrating an operational flowchart for transforming a description of an industrial process equipment into a semantically enriched and graph-based data information model according to an embodiment.

FIG. 8 shows a flowchart for querying and extracting OPC UA information from the Datalog Engine in order to recursively instantiate all references pointing from a source node.

By a first act 802, the database is queried for a starting base node using a given NodeID.

In a subsequent decision act 804, a decision is made whether the node with the given NodeID is a base node or not. If the given node is no base node, represented by a branch N (»No«) of decision act 804, a subsequent act 806 is carried out. The subsequent act 806 returns the node with the NodeID.

In a subsequent decision act 804, a decision is made whether a base node with the given NodeID exists or not. If the node does not exist, represented by a branch N (»No«) of decision act 804, there is nothing to map anymore. The procedure is completed by act 806. If a base node with the current NodeID exists, which is represented by a branch Y (»Yes«) pointing vertically downward from decision act 804, a subsequent act 808 is carried out. In the subsequent act 808, the database is queried for node attributes and node type of the base node.

In a subsequent act 810, the node information is processed, and the current node is marked as known. In a subsequent act 812, the database is queried for references with a (source) node ID that matches with the current NodeID. In a subsequent act 814, the queried reference information is stored. In a subsequent act 816, for each of the stored reference information, one or more NodeIDs are targeted and/or extracted.

In a subsequent decision act 818, a decision is made of whether a target node is already known or not. Once all nodes are known, represented by a branch Y (»Yes«) pointing vertically upward from decision act 818, the procedure is completed by act 822.

If the referenced target node is not known, represented by a branch N (»No«) of decision act 818, the flow branches to the act 808, which will be recursively called, see reference sign 820, with NodeID as target ID.

The source node may be an object root node of an OPC UA server. One has only to query the database for references with a source node ID matching that of the root node. The database will return a list of all references associated with the root node, thus giving a list of all the target node IDs of the reference. This returned list may be recursively processed, allowing for the hierarchical information model of the OPC UA IM to be traversed and processed.

The OPC UA information extracted from the Query Engine may be converted into XML nodes within an XML Schema of OPC UA. OPC UA Server Config Generator accomplishes this task, and then passes the information downstream to the OPC UA Server. In this way, every standard OPC UA client may access data that originated as EDD field device descriptions.

The embodiments show the following benefits. The mapping system of the gateway according to the embodiments is capable of interpreting input information, particularly EDD, using stored mapping knowledge, deductively creating information mappings from the input information model into the OPC UA information. The need for trivial one-to-one hard-coded mapping approaches is thus eliminated, and the external storage and querying of mapping knowledge are allowed for.

The mapping knowledge is extensible for enabling new classes of applications. Beyond a usage for monitoring field devices, the mapping knowledge is also capable of supporting a management of field assets.

The mapping is suited to be implemented on edge or constrained devices. Typically, these are Internet of Things (IoT) gateways or constrained and inexpensive devices. While the mapping may be also accomplished with other semantic formalism, Datalog may be easily implemented on constrained devices. At the same time, Datalog is expressive enough to be used for the mapping of EDD to an OPC UA information model. Datalog was chosen as a preferred formalism for implementing the knowledge mapping system because of algorithmic efficiency and possibility to implement the algorithms on constraint devices. The semantics of Datalog is well understood, and efficient algorithms have been developed over the past 30 years.

The mapping according to the embodiments may be applicable for edge or constrained devices, however, suited to be implemented in a cloud environment as well.

The embodiments allow for a discovery of the mapping knowledge or a part thereof. A user or an application may, for example, query the storage of mapping knowledge via expressive semantic queries.

Extensibility of the mapping knowledge with other models is a further advantage. It has been shown how the Mapping Knowledge may be created for EDDL and OPC UA IM. Applying similar procedures, it is possible to create Mapping Knowledge for another field device description model or an extension of this one.

Further advantages are achieved by the portability and modularity of the system. The mapping knowledge is transparently available instead of being hard-coded. As such, the mapping knowledge may be, for example, downloaded, exchanged, updated, etc.

The embodiments allow for a validation of field device data against the mapping knowledge. For example, it may be checked whether field device data is in conformance to a specification.

The embodiments may allow a direct access of information. For many added-value applications (e.g., related to monitoring, management, and optimization of field level assets), it is desirable not to access field information over a controller.

The mapping system reduces the complexity of mapping complex information models where large parts of mapping knowledge may be inherited from previous mappings or complex structures may be mapped by deductively applying mapping rules in a bottom-up fashion.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A gateway for transforming a description of industrial process equipment into a semantically enriched and graph-based data information model for automation purposes within an industrial environment supporting an open industry standard, the gateway comprising:
   a processor configured to:
      parse information entities in the description of the industrial process equipment by a field communication protocol;
      transform the parsed information entities into Datalog declarative logic facts and assert the Datalog declarative logic facts within a deductive database; and
      using a knowledge engine configured as a Datalog Engine and a mapping knowledge base, apply mapping rules to the Datalog declarative logic facts, wherein the mapping rules are structured in a hierarchical fashion so as to utilize a reusability, and wherein the Datalog declarative logic facts are deductively mapped onto the graph-based data information model; and
   an interface configured to access a graph-based data object model,
   wherein the semantically enriched and graph-based data information model is an open platform communications (OPC) unified architecture (UA) information model, and
   wherein a mapping rule is applied for creating an OPC UA Base Node Class using attributes taken from a corresponding variable in the description of the industrial process equipment.

2. The gateway of claim 1, wherein a mapping rule is applied for creating an OPC UA Object node by referencing corresponding attributes in the description of the industrial process equipment including a manufacturer identification, a device type, a device revision, and a device description revision.

3. The gateway of claim 1, wherein the description of the industrial process equipment is expressed by:
   an Electronic Device Description Language (EDDL);
   a Field Device Tool/Device Type Manager protocol (FDT/DTM);
   a General Station Description (GSD); or
   an IO Device Description.

4. The gateway of claim 1, wherein the interface is a gateway-internal open platform communications (OPC) unified architecture (UA) server.

5. The gateway of claim 1, wherein the knowledge engine is a Datalog Engine.

6. The gateway of claim 5, wherein the knowledge engine, a parsing module, and the Datalog engine are substantially integrated within one functional unit.

7. The gateway of claim 1, wherein the field communication protocol is a Highway Addressable Remote Transducer (HART) protocol.

8. The gateway of claim 1, further comprising at least one equipment interface for connecting at least one industrial process equipment.

9. A method for transforming a description of industrial process equipment into a semantically enriched and graph-based data information model for automation purposes within an industrial environment supporting an open industry standard, the method comprising:
   parsing information entities in the description of the industrial process equipment by a field communication protocol, transforming the parsed information entities into Datalog declarative logic facts, and asserting the Datalog declarative logic facts within a deductive database;
   using a knowledge engine configured as a Datalog Engine and a mapping knowledge base for applying mapping rules to the Datalog declarative logic facts, wherein the mapping rules are structured in a hierarchical fashion so as to utilize a reusability, and wherein the declarative Datalog logic facts are deductively mapped onto the graph-based data information model; and
   providing a graph-based data object model by an interface module,
   wherein the semantically enriched and graph-based data information model is an open platform communications (OPC) unified architecture (UA) information model, and
   wherein a mapping rule is applied for creating an OPC UA Base Node Class using attributes taken from a corresponding variable in the description of the industrial process equipment.

* * * * *